(12) United States Patent
Phua

(10) Patent No.: US 9,791,617 B2
(45) Date of Patent: Oct. 17, 2017

(54) GUIDING LIGHT PLATFORM

(71) Applicant: Wonderlight International Ltd., Hong Kong (HK)

(72) Inventor: Ooi Yong Phua, Hong Kong (HK)

(73) Assignee: Wonderlight International Ltd., Hong Kong (HK)

( * ) Notice: Subject to any disclaimer, the term of this patent is extended or adjusted under 35 U.S.C. 154(b) by 225 days.

(21) Appl. No.: 14/700,170

(22) Filed: Apr. 30, 2015

(65) Prior Publication Data

US 2016/0004008 A1  Jan. 7, 2016

(30) Foreign Application Priority Data

Jul. 2, 2014  (HK) .................................. 14106697.7

(51) Int. Cl.
| | |
|---|---|
| *F21V 15/01* | (2006.01) |
| *F21V 33/00* | (2006.01) |
| *F21V 8/00* | (2006.01) |
| *G09F 13/00* | (2006.01) |

(52) U.S. Cl.
CPC .......... *G02B 6/0096* (2013.01); *G02B 6/0081* (2013.01)

(58) Field of Classification Search
CPC ............. G09F 13/04; G09F 2013/0418; G09F 2013/0445; G09F 2013/049
USPC ................................ 362/97.1–97.4, 632–634
See application file for complete search history.

(56) References Cited

U.S. PATENT DOCUMENTS

| | | | | |
|---|---|---|---|---|
| 3,913,872 | A * | 10/1975 | Weber ..................... | F21V 11/00 355/67 |
| 7,726,867 | B2 * | 6/2010 | Jing ..................... | G02B 6/0071 362/614 |
| 9,052,426 | B2 * | 6/2015 | Lin ......................... | G02B 6/005 |
| 2003/0011898 | A1 * | 1/2003 | Mai ........................ | H04N 1/401 359/808 |
| 2005/0157520 | A1 * | 7/2005 | Chuang ............. | G02F 1/133308 362/632 |
| 2006/0087831 | A1 * | 4/2006 | Kramer ................ | A47G 19/025 362/101 |
| 2010/0265722 | A1 * | 10/2010 | Sohn ....................... | F21V 15/01 362/311.02 |

(Continued)

FOREIGN PATENT DOCUMENTS

| | | |
|---|---|---|
| CN | 101329019 A | 12/2008 |
| CN | 201270010 Y * | 7/2009 |

(Continued)

OTHER PUBLICATIONS

Search Report issued by the Chinese Patent Office dated Oct. 17, 2014.

(Continued)

*Primary Examiner* — Andrew Coughlin
*Assistant Examiner* — Keith Delahoussaye

(57) ABSTRACT

A guiding light platform includes a frame having a side plate, a top light-transmitting plate covering top of the frame, a bottom plate covering bottom of the frame, a LED strip mounted on the frame, and a separation plate mounted between the LED strip and the bottom plate. A top inner portion of the side plate is formed with a slanted surface disposed underneath and at an angle with respect to a bottom surface of the top light-transmitting plate to thereby define a space for receiving therein a waterproof adhesive.

18 Claims, 5 Drawing Sheets

(56) References Cited

U.S. PATENT DOCUMENTS

2013/0148380 A1* 6/2013 Kim .................... F21V 7/00
                                                    362/613
2013/0216182 A1* 8/2013 Ouderkirk ............ G02B 6/26
                                                    385/31

FOREIGN PATENT DOCUMENTS

| CN | 102011974 A | 4/2011 | |
|---|---|---|---|
| CN | 202664949 U | 1/2013 | |
| CN | 203457985 U | * 3/2014 | .......... F21V 33/0012 |

OTHER PUBLICATIONS

International Search Report of PCT Patent Application No. PCT/CN2015/083150 dated Sep. 18, 2015.

* cited by examiner

GUIDING LIGHT PLATFORM

CROSS-REFERENCE TO RELATED APPLICATIONS

This application claims the benefit of Hong Kong short-term patent application No. 14106697.7 filed on Jul. 2, 2014; the contents of which is hereby incorporated by reference.

FIELD OF TECHNOLOGY

The present application relates to a guiding light platform.

BACKGROUND

Many of the existing guiding light devices are used for illumination and advertisement, while only a few of them are used for creation of atmosphere. Those existing guiding light devices for illumination, advertisement and creation of atmosphere are usually installed in a rather high position above the ground. Therefore, it is difficult to reach and easily move those devices without using any assisting tools.

SUMMARY

According to one aspect, there is provided a guiding light platform including:

(a) a horizontally disposed rectangular frame comprising four aluminum side plates and four aluminum corner pieces joining the four aluminum side plates at four corners of the rectangular frame respectively, each corner piece comprising a main stem and first and second supports extending perpendicularly from the main stem, wherein the first and second supports are adapted to be inserted into opening ends formed on the side plates, each support is formed with a first screw hole, and each end of each side plate is formed with a second screw hole so that the side plates can be fastened to the corner pieces by driving screws through the first and second screw holes;

(b) a top light-transmitting plate covering top of the frame;

(c) a bottom plate covering bottom of the frame;

(d) a LED strip mounted along an inner surface the frame;

(e) a separation plate mounted between the LED strip and the bottom plate;

(f) a battery case provided on the bottom plate for accommodating therein a rechargeable battery; and (g) an anti-skid leg provided at a bottom portion of the bottom plate;

(h) wherein a top inner portion of each side plate is formed with a slanted surface disposed underneath and at an angle of 60° with respect to a bottom surface of the top light-transmitting plate to thereby define a space for receiving therein a transparent waterproof adhesive.

According to another aspect, there is provided a guiding light platform including:

(a) a frame comprising a side plate;

(b) a top light-transmitting plate covering top of the frame;

(c) a bottom plate covering bottom of the frame;

(d) a LED strip mounted on the frame; and (e) a separation plate mounted between the LED strip and the bottom plate;

(f) wherein a top inner portion of the side plate is formed with a slanted surface disposed underneath and at an angle with respect to a bottom surface of the top light-transmitting plate to thereby define a space for receiving therein a waterproof adhesive.

The angle may be 60°. The waterproof adhesive may be transparent. The frame may be a rectangular frame. The frame may include four side plates and four corner pieces joining the four side plates at four corners of the rectangular frame respectively.

Each corner piece may include a main stem and first and second supports extending perpendicularly from the main stem. The first and second supports may be adapted to be inserted into opening ends formed on the side plates. Each support may be formed with a first screw hole, and each end of each side plate may be formed with a second screw hole so that the side plates can be fastened to the corner pieces by driving screws through the first and second screw holes.

The side plate may be provided with a groove for receiving therein the top light-transmitting plate. A battery case may be provided on the bottom plate for accommodating therein a battery. An anti-skid leg may be provided at a bottom portion of the bottom plate. The top light-transmitting plate may be a frosted acrylic plate or a frosted glass.

The LED strip may be attached along an inner surface of the side plate by an adhesive tape, or within a trough formed on the side plate.

The bottom plate may be made of aluminum. The bottom plate may be made of plastic. The separation plate may be made of Styrofoam. The frame may be made of aluminum.

Although the guiding light platform is shown and described with respect to certain embodiments, it is obvious that equivalents and modifications will occur to others skilled in the art upon the reading and understanding of the specification. The guiding light platform in the present application includes all such equivalents and modifications, and is limited only by the scope of the claims.

BRIEF DESCRIPTION OF THE DRAWINGS

Specific embodiments of the guiding light platform will now be described by way of example with reference to the accompanying drawings wherein.

DETAILED DESCRIPTION

Reference will now be made in detail to a preferred embodiment of the guiding light platform, examples of which are also provided in the following description. Exemplary embodiments of the guiding light platform are described in detail, although it will be apparent to those skilled in the relevant art that some features that are not particularly important to an understanding of the guiding light platform may not be shown for the sake of clarity.

Furthermore, it should be understood that the guiding light platform is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the protection.

Figure 1:
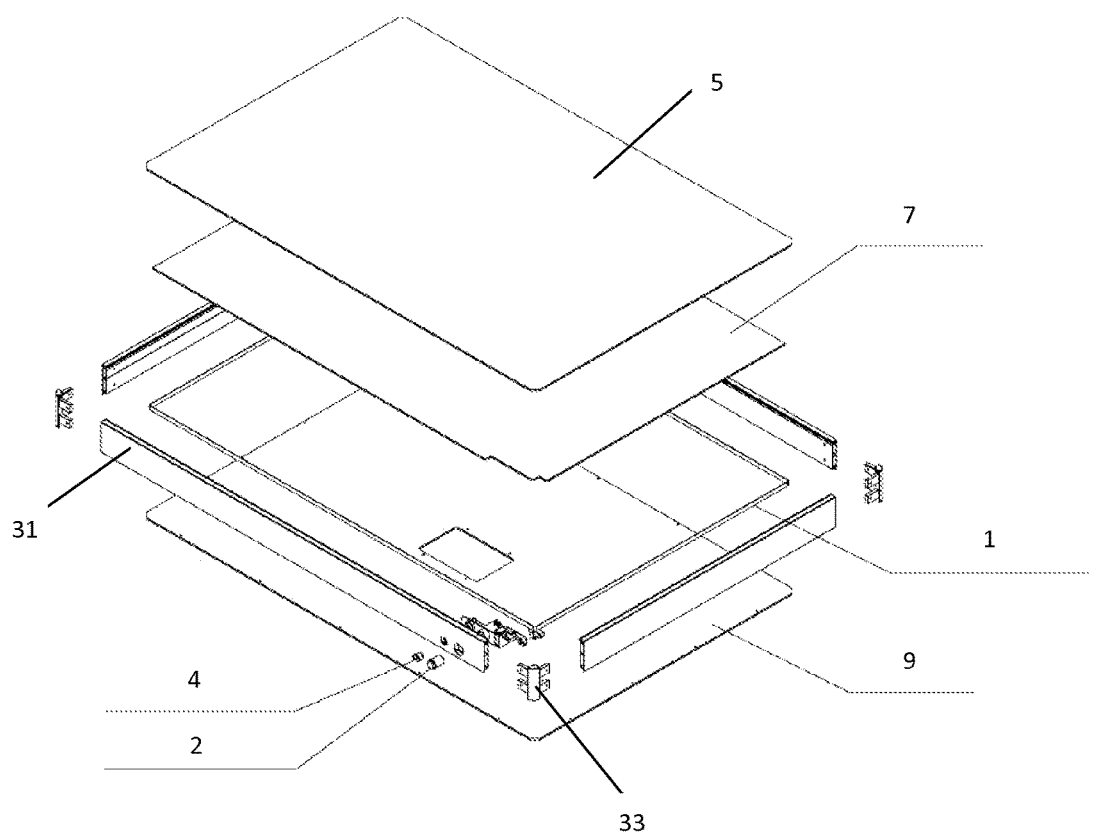
FIG. 1 is a perspective view of the guiding light platform according to an embodiment of the present application.

FIG. 1 is a perspective view of the guiding light platform according to an embodiment of the present application. The guiding light platform may include a horizontally disposed frame 3, a top light-transmitting plate 5 covering top of the frame 3, a bottom plate 9 covering bottom of the frame 3, a LED strip 1 mounted on the frame 3, and a separation plate 7 mounted between the LED strip 1 and the bottom plate 9.

According to the illustrated embodiment, the frame 3 is a rectangular frame. The rectangular frame 3 may include four side plates 31 and four corner pieces 33 joining the four side plates 31 at the four corners of the rectangular frame respectively by screws or any other suitable fasteners. The rectangular frame 3 may be made of aluminum or any other suitable material.

The LED strip 1 may be mounted along the periphery of the rectangular frame 3. The width of the LED strip 1 may be about 8 mm. The distance between two adjacent LEDs provided on the LED strip 1 may be about 33 mm. The LED strip 1 can be attached to an inner surface of the side plate 31 by strong chemical adhesive tape. The side plate 31 may be formed with a trough for receiving therein the LED strip 1. This makes installation of the LED strip 1 simple and convenient. It is appreciated that the LED strip 1 with LEDs is more flexible in usage, faster in photo response, lower in cost, save more energy, and longer in lifespan than conventional light bulbs. Light from LEDs can be more evenly distributed and can generate a soft atmosphere.

The top light-transmitting plate 5 can be provided at an upper portion of the frame 3. The upper surface of the top light-transmitting plate 5 can be flat. Objects or food can be placed on top of the light-transmitting plate 5. The top light-transmitting plate 5 may be made of frosted acrylic plate, frosted glass or any other suitable material. The frosted acrylic plate or glass can make light passing through the top light-transmitting plate 5 become more soft and evenly distributed.

The separation plate 7 can be mounted between the LED strip 1 and the bottom plate 9. The separation plate 7 can reflect light from the LED strip 1 towards the top light-transmitting plate 5. The separation plate 7 can be used to cover up electrical components mounted on the bottom plate 9. This can prevent the formation of shadows when light is allowed to pass downwards towards the electrical components mounted on the bottom plate 9. The separation plate 7 may be made of styrofoam or any other appropriate material. Styrofoam is soft and light and can make the guiding light platform easy to be carried around.

The frame 3 may further include an on/off switch 2 and a recharge socket 4. The on/off switch 2 and the recharge socket 4 can be mounted on the side plate 31 at one side of the frame 3. A user can recharge a rechargeable battery provided on the guiding light platform by connecting the recharge socket 4 to a power source.

Figure 2:
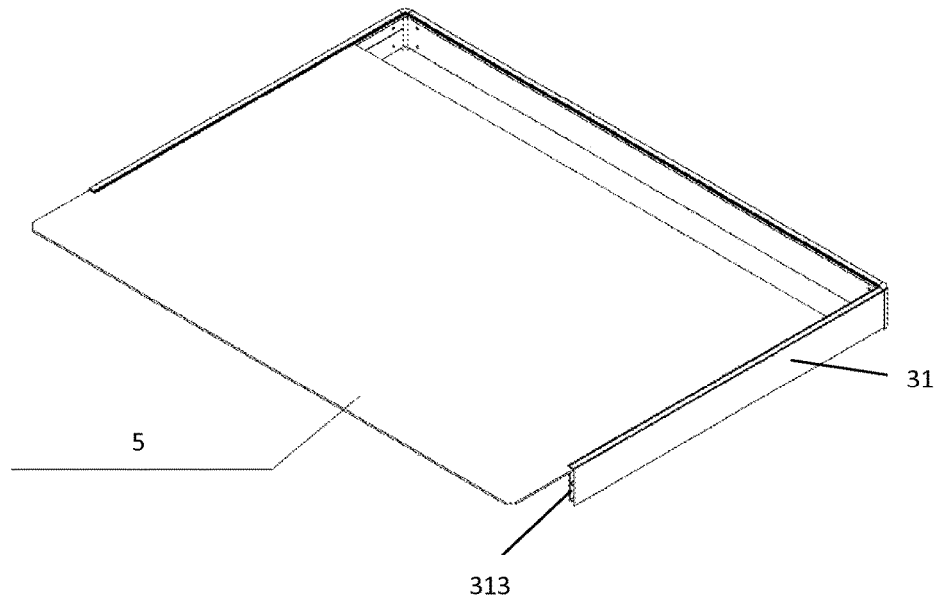
FIG. 2 shows the assembling of the top portion of the guiding light platform.
Figure 3:
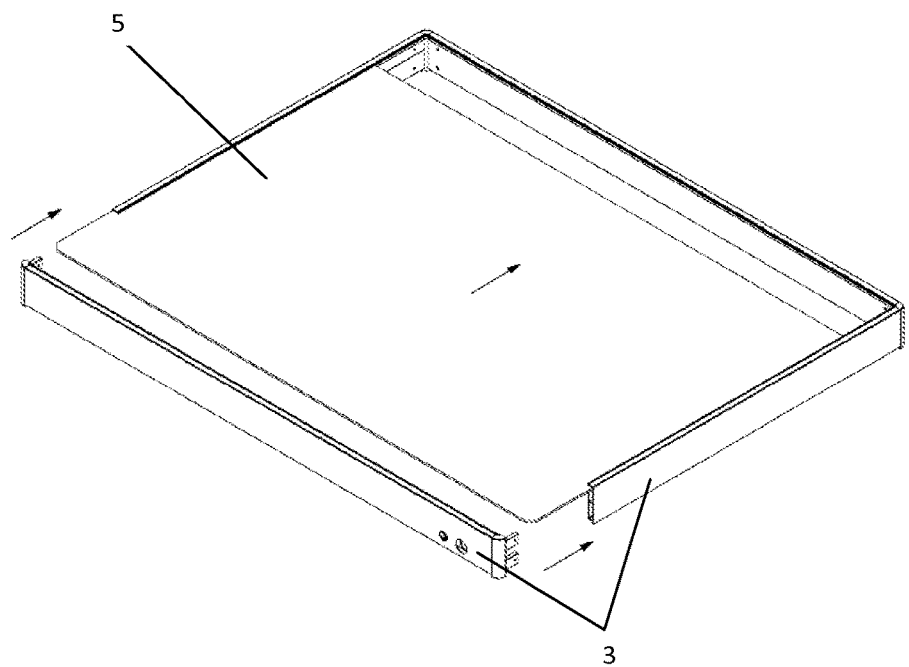
FIG. 3 shows the completion of assembling of the top portion of the guiding light platform.

FIG. 2 shows the assembling of the top portion of the guiding light platform, and FIG. 3 shows the completion of the assembling of the top portion of the guiding light platform.

To assemble the frame 3, one can first join three side plates 31 together by two corner pieces 33 to form a C-shaped frame. One can then insert the top light-transmitting plate 5 into the C-shaped frame. After the top light-transmitting plate 5 is fully inserted into the C-shaped frame, the fourth side plate 31 is then joined to the three joined side plates 31 by two more corner pieces 33. The assembly of the rectangular frame 3 is then completed.

Figure 4:
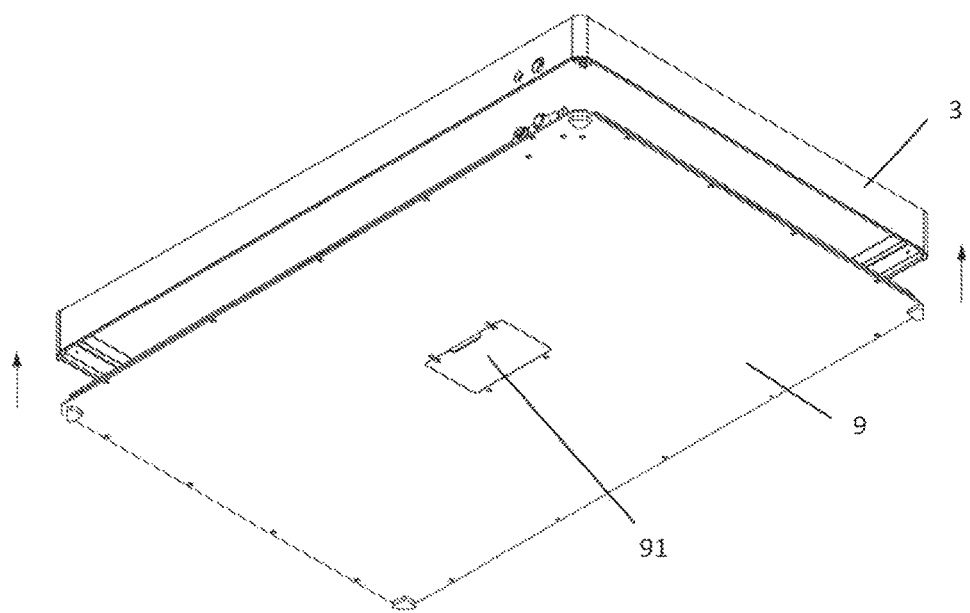
FIG. 4 is a bottom perspective view of the guiding light platform according to an embodiment of the present application.

FIG. 4 is a bottom perspective view of the guiding light platform according to an embodiment of the present application. The bottom plate 9 can be installed at the lower portion of the frame 3. Electrical components of the guiding light platform can be mounted on the bottom plate 9. The bottom plate 9 may be made of aluminum, plastic or any other suitable material.

The electrical components of the guiding light platform may include a battery case 91, the on/off switch 2, the recharge socket 4, and a control circuit, etc. The battery case 91 can be provided on the bottom plate 9 for accommodating therein a rechargeable lithium battery. A cover can be provided at the bottom of the battery case 91 to facilitate replacement of the battery. The use of battery as power source can make the guiding light platform portable.

An anti-skid leg or legs can be provided at the bottom portion of the bottom plate 9 for supporting the guiding light platform on a floor.

Figure 5:
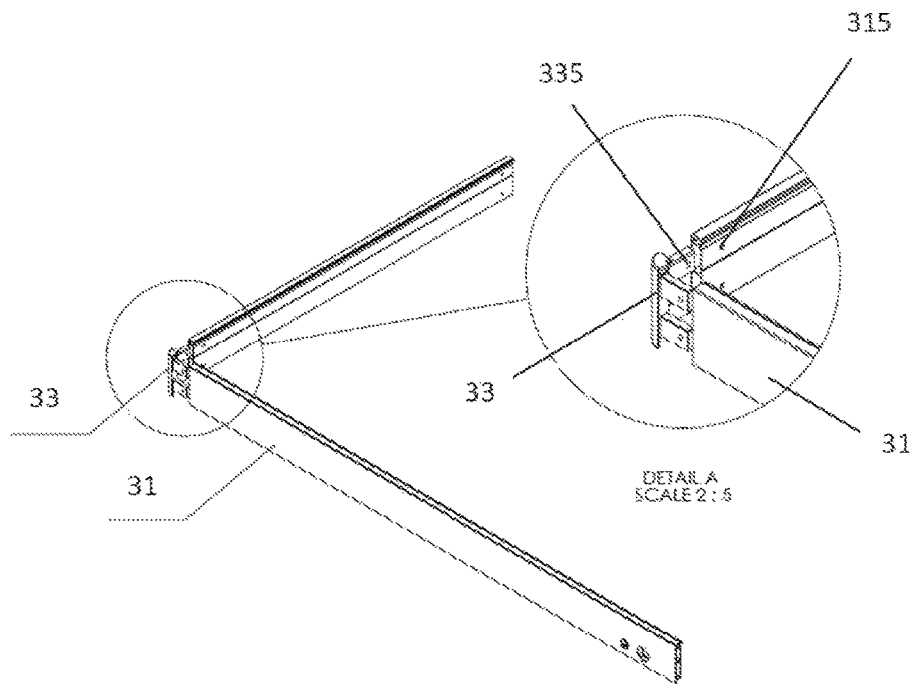
FIG. 5 shows two side plates joining by a corner piece of the guiding light platform according to an embodiment of the present application.
Figure 6:
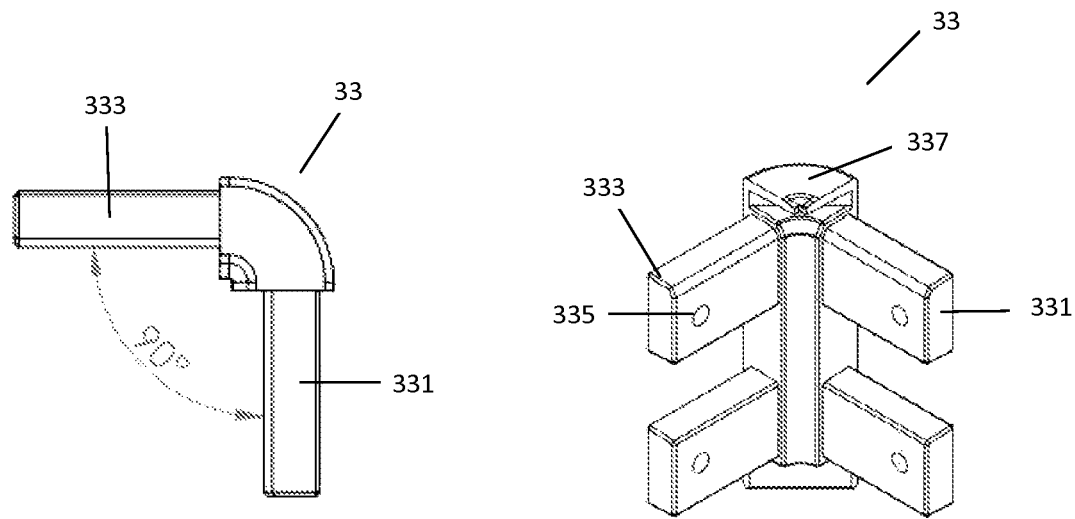
FIG. 6 shows top and perspective views of the corner piece of the guiding light platform according to an embodiment of the present application.

FIG. 5 shows two side plates joining at a corner piece of the guiding light platform according to an embodiment of the present application, and FIG. 6 shows top and perspective views of the corner piece 33 of the guiding light platform according to an embodiment of the present application.

The corner piece 33 may include a main stem 337 and first and second supports 331, 333 extending perpendicularly from the main stem 337. The first and second supports 331, 333 are adapted to be inserted into opening ends 313 (as indicated in FIG. 2) formed on the side plates 31. According to the illustrated embodiment in FIG. 6, there are two first supports 331 and two second supports 333, and therefore two opening ends 313 are formed at each end of each side plate 31.

Each support 331, 333 may be formed with a screw hole 335, and each end of each side plate 31 may be formed with a corresponding screw hole 315 so that the side plates 31 can be fastened to the corner pieces 33 by driving screws through the screw holes 335 of the corner pieces 33 and the corresponding screw holes 315 of the side plates 31. For a rectangular frame 3 having four side plates 31 and four corner pieces 33, the angle between the first and second supports 331, 333 is 90°.

Although it has been shown and described that the frame 3 is a quadrangle frame having four side plates, it is understood by one skilled in the art that the frame 3 may have other shapes such as circle, oval, triangle, square and polygon, etc. For a triangular frame, only three side plates and three corner pieces are needed.

Figure 7:
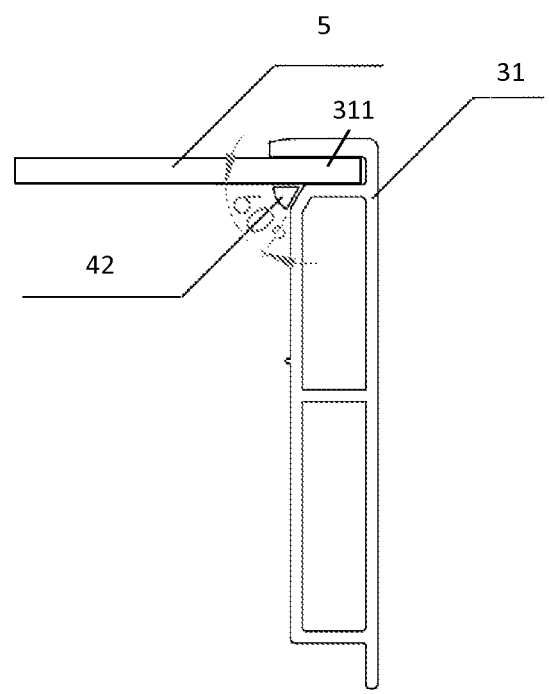
FIG. 7 shows the joining of the top light-transmitting plate to a side plate according to an embodiment of the present application.

FIG. 7 shows the joining of a light-transmitting plate to a side plate according to an embodiment of the present application.

According to the illustrated embodiment, the top end of the side plate 31 can be formed with an inwardly facing groove 311. An edge of the top light-transmitting plate 5 can be inserted into the groove 311 of the side plate 31.

A top inner portion of the side plate 31 may be formed with a slanted surface disposed underneath and at an angle with respect to the bottom surface of the top light-transmitting plate 5 to thereby define a space for receiving or concealing therein a waterproof paste or adhesive 42. According to the illustrated embodiment, the angle between the slanted surface of the side plate 31 and the bottom surface of the top light-transmitting plate 5 is 60°. It is contemplated that the angle between the slanted surface of the side plate 31 and the bottom surface of the top light-transmitting plate 5 can be more or less than 60°. The waterproof adhesive 42 may be made of a transparent material so as to reduce light obstruction. The waterproof adhesive 42 can prevent liquid spilled on the top light-transmitting plate 5 from flowing into the frame 3. This can ensure safety while using the guiding light platform.

Figure 8:
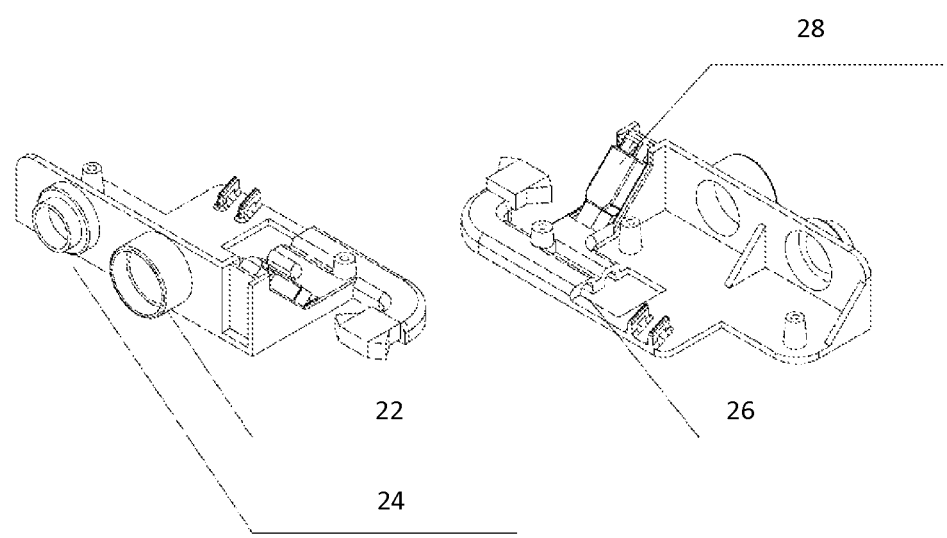
FIG. 8 shows top and bottom perspective view of a switch and socket housing of the guiding light platform according to an embodiment of the present application.

FIG. 8 shows top and bottom perspective view of a switch and socket housing of the guiding light platform according to an embodiment of the present application. The switch and socket housing may include a switch bore 22 for holding therein the on/off switch 2, and a socket bore 24 for holding therein the recharge socket 4.

The guiding light platform may be controlled by an infrared remote control. The infrared remote control can be provided with a plurality of buttons. The buttons can be used to switch on, switch off, change color, adjust brightness and control color-changing modes of the LEDs. The color-changing modes may include alternate color-changing for a 7-color LED strip, gradual color-changing for a 7-color LED strip, alternate color-changing for a 3-color LED strip, gradual color-changing for a 3-color LED strip, etc. Electrical components of the guiding light platform may include an infrared receiver. When a user presses a button on the infrared remote control within a certain distance, commands can be transmitted to the infrared receiver on the guiding light platform to control on/off, color change, brightness and color-changing modes of the LEDs. Apart from controlling the LEDs using the infrared remote control, a user can also control the LEDs using the on/off switch 2.

A sloped surface 28 may be formed on the switch and socket housing. The infrared receiver can be mounted on the sloped surface 28 in such a position that the sensing part of the infrared receiver is facing generally upwards towards the upper portion of the frame 3 to facilitate clear reception of infrared signals from the infrared remote control. The switch and socket housing may further be provided with grooves 26 for receiving therein wires of the electrical components.

The guiding light platform can be used at night. It can be used in many places such as in a party, on the grass, on a boat, etc. The top light-transmitting plate 5 can provide a sufficient space where objects can be placed and meals can be served. The LED strip 1 can generate light from the top light-transmitting plate 5, and the guiding light platform can create a soft and pleasant atmosphere. The guiding light platform is low in manufacturing cost, light in weight and portable.

While the guiding light platform has been shown and described with particular references to a number of preferred embodiments thereof, it should be noted that various other changes or modifications may be made without departing from the scope of the appended claims.

What is claimed is:

1. A guiding light platform comprising:
    (a) a horizontally disposed rectangular frame comprising four aluminum side plates and four aluminum corner pieces joining the four aluminum side plates at four corners of the rectangular frame respectively, each corner piece comprising a main stem and first and second supports extending perpendicularly from the main stem, the main stem being disposed perpendicular to a plane of the horizontally disposed rectangular frame, wherein the first and second supports are oriented at right angle to each other and are adapted to be inserted into opening ends formed on the side plates, each support is formed with a first screw hole, and each end of each side plate is formed with a second screw hole so that the side plates can be fastened to the corner pieces by driving screws through the first and second screw holes;
    (b) a top light-transmitting plate at top of the frame;
    (c) a bottom plate covering bottom of the frame;
    (d) a LED strip mounted along an inner surface the frame;
    (e) a separation plate mounted between the LED strip and the bottom plate;
    (f) a battery case provided on the bottom plate for accommodating therein a rechargeable battery; and
    (g) an anti-skid leg provided at a bottom portion of the bottom plate;
    (h) wherein an inner surface at a top portion of each side plate is formed with a slanted surface disposed underneath and at an angle of 60° with respect to a bottom surface of the top light-transmitting plate, the slanted surface and the bottom surface of the top light-transmitting plate defining an inwardly facing space for receiving therein a transparent waterproof adhesive; and
    (i) wherein the guiding light platform further comprises a switch and socket housing, the switch and socket housing being formed with a switch, a switch bore, a recharge socket, a socket bore, and a sloped surface so oriented that a sensing part of an infrared receiver mounted on the sloped surface faces upwards towards an upper portion of the horizontally disposed rectangular frame.

2. A guiding light platform comprising:
    (a) a horizontally disposed frame comprising a side plate;
    (b) a top light-transmitting plate at top of the frame;
    (c) a bottom plate covering bottom of the frame;
    (d) a LED strip mounted on the frame; and
    (e) a separation plate mounted between the LED strip and the bottom plate;
    (f) wherein an inner surface at a top portion of each side plate is formed with a slanted surface disposed underneath and at an angle of 60° with respect to a bottom surface of the top light-transmitting plate, the slanted surface and the bottom surface of the top light-transmitting plate defining an inwardly facing space for receiving therein a transparent waterproof adhesives; and
    (g) wherein the guiding light platform further comprises a switch and socket housing, the switch and socket housing being formed with a switch, a switch bore, a recharge socket, a socket bore, and a sloped surface so oriented that a sensing part of an infrared receiver mounted on the sloped surface faces upwards towards an upper portion of the horizontally disposed frame.

3. The platform as claimed in claim 2, wherein the frame is a rectangular frame.

4. The platform as claimed in claim 3, wherein the frame comprises four side plates and four corner pieces joining the four side plates at four corners of the rectangular frame respectively.

5. The platform as claimed in claim 4, wherein each corner piece comprises a main stem and first and second supports extending perpendicularly from the main stem, the main stem being disposed perpendicular to a plane of the horizontally disposed rectangular frame, and the first and second supports being oriented at right angle to each other.

6. The platform as claimed in claim 5, wherein the first and second supports are adapted to be inserted into opening ends formed on the side plates.

7. The platform as claimed in claim 6, wherein each support is formed with a first screw hole, and each end of each side plate is formed with a second screw hole so that the side plates can be fastened to the corner pieces by driving screws through the first and second screw holes.

8. The platform as claimed in claim 2, wherein the side plate is provided with a groove for receiving therein the top light-transmitting plate.

9. The platform as claimed in claim 2, wherein a battery case is provided on the bottom plate for accommodating therein a battery.

10. The platform as claimed in claim 2, wherein an anti-skid leg is provided at a bottom portion of the bottom plate.

11. The platform as claimed in claim 2, wherein the top light-transmitting plate is a frosted acrylic plate.

12. The platform as claimed in claim 2, wherein the top light-transmitting plate is a frosted glass.

13. The platform as claimed in claim 2, wherein the LED strip is attached along an inner surface of the side plate by an adhesive tape.

14. The platform as claimed in claim 2, wherein the LED strip is attached within a trough formed on the side plate.

15. The platform as claimed in claim 2, wherein the bottom plate is made of aluminum.

16. The platform as claimed in claim 2, wherein the bottom plate is made of plastic.

17. The platform as claimed in claim 2, wherein the separation plate is made of styrofoam.

18. The platform as claimed in claim 2, wherein the frame is made of aluminum.

* * * * *